United States Patent

[11] 3,632,311

| [72] | Inventors | William L. Kovacs<br>Springfield Township;<br>Phillip F. Pflaumer, Colerain Township;<br>David D. Whyte, Springfield Township,<br>Hamilton County, all of Ohio |
|---|---|---|
| [21] | Appl. No. | 41,581 |
| [22] | Filed | May 28, 1970 |
| [45] | Patented | Jan. 4, 1972 |
| [73] | Assignee | The Proctor & Gamble Company<br>Cincinnati, Ohio |

[54] SEPARATION OF PHOSPHOROUS ACID FROM MIXTURES OF PHOSPHOROUS ACID AND PHOSPHORIC ACID BY AMINE EXTRACTION
11 Claims, No Drawings

[52] U.S. Cl. ..................................................... 23/165, 23/312
[51] Int. Cl. ..................................................... C01b 25/18
[50] Field of Search ........................................... 23/165, 312 P

[56] References Cited
UNITED STATES PATENTS

| 3,361,527 | 1/1968 | Hinkebein et al............ | 23/165 |
| 3,408,158 | 10/1968 | Dryoff et al................... | 23/165 |
| 3,458,281 | 7/1969 | Demarcq...................... | 23/165 |
| 3,479,139 | 11/1969 | Koerner....................... | 23/165 |

OTHER REFERENCES

The Acid Binding Properties of Long Chain Aliphatic Amines, Smith et al., J.S.C.I., 1948, p. 48–51

Agers et al. The Purification of Inorganic Acid by the Amine Liquid Ion Exchange Process (1963)

*Primary Examiner*—Oscar R. Vertiz
*Assistant Examiner*—Gregory A. Heller
*Attorneys*—Jack D. Schaeffer and Richard C. Witte ABSTRACT: Disclosed herein is a process for separating phosphorous acid ($H_3PO_4$ from mixtures of phosphorous and phosphoric acid ($H_3PO_4$). An aqueous solution of the acids is mixed with a solvent which is essentially immiscible with water and which contains an alkyl amine, thereby causing the $H_3PO_3$ to migrate preferentially into the solvent phase primarily through formation of an amine-acid salt and resulting in an extract phase which is rich in $H_3PO_3$ and an aqueous raffinate phase rich in $H_3PO_4$. The extract phase is then removed from the raffinate phase and the acid is displaced from the extract phase by a suitable means such as acid-stripping, alkali-stripping or high-temperature hydrolysis.

SEPARATION OF PHOSPHOROUS ACID FROM MIXTURES OF PHOSPHOROUS ACID AND PHOSPHORIC ACID BY AMINE EXTRACTION

BACKGROUND OF THE INVENTION

This invention relates to the separation of orthophosphorous acid ($H_3PO_3$) from mixtures of orthophosphorous acid and orthophosphoric acid ($H_3PO_4$). For purposes of simplicity, these two acids will be referred to hereinafter as phosphorous and phosphoric acid, respectively, or by their chemical formulas.

Phosphorous acid is useful as a reducing agent where a strong, but relatively slow-acting reducing agent is desirable. It is also useful as a starting material for the production of phosphitic esters such as diethyl phosphite, which is useful as a lubricant additive, antioxidant and solvent.

Heretofore the utilization of phosphorous acid has been somewhat limited by the relatively high cost of this acid. U.S. Pat. applications, Ser. No. 566,482, filed July 20, 1966 now Pat. No. 3,532,461 by David D. Whyte et al. and Ser. No. 678,280, filed Oct. 26, 1967, now Pat. No. 3,528,772 by David D. Whyte et al. describe economically advantageous methods for producing phosphorous acid from elemental phosphorous. According to these methods, however, some phosphoric acid is formed concurrently with the phosphorous acid. In order to realize the full economic potential of these methods, a convenient means of separating phosphorous acid from phosphoric acid is desirable.

DESCRIPTION OF THE INVENTION

An object of the present invention is to provide an improved process for separating $H_3PO_3$ from mixtures $H_3PO_3$ and $H_3PO_4$.

A further object is to provide a process wherein the extracted acid can be readily recovered from the amine-containing solvent.

These and further objects will be apparent from the following description.

As used herein, the term "separation," when applied to $H_3PO_3$ and $H_3PO_4$ mixtures is not limited to treatments producing complete removal of one acid from the other, but also includes a treatment whereby a mixture having a given weight ratio of $H_3PO_3:H_3PO_4$ is transformed into two mixtures, one having a higher weight ratio of $H_3PO_3:H_3PO_4$ than in the original mixture, and the other having a lower weight ratio of $H_3PO_3:HPO_4$ than in the original mixture. If the mixture having the higher weight ratio of $H_3PO_3:H_3PO_4$ is subjected to a second extraction according to the process herein, a still higher ratio of $H_3PO_3:H_3PO_4$ can be obtained.

According to the present invention, $H_3PO_3$ can be separated from an aqueous solution of $H_3PO_3$ and $H_3PO_4$ by a process which comprises the steps of (1) mixing the aqueous solution of $H_3PO_3$ and $H_3PO_4$ with an alkyl amine and a solvent which is essentially immiscible with water, thereby causing the $H_3PO_3$ to preferentially migrate into the solvent phase primarily through formation of an amine-acid salt, forming an extract phase rich in $H_3PO_3$ and a raffinate phase rich in $H_3PO_4$, (2) separating the extract phase from the raffinate phase, and (3) displacing the acid from the solvent phase by a suitable means such as acid "stripping" with an aqueous solution of an acid stronger than $H_3PO_3$, alkali "stripping" or high-temperature hydrolysis. The term "stripping" as used herein, refers to the chemical displacement of $H_3PO_3$ and $H_3PO_4$ from the extract phase with strong acids or with alkali. The aqueous solution, rich in $H_3PO_3$, which results from the displacement can be adjusted to any desired strength by dilution or evaporation, or the acid can be recovered by conventional techniques such as crystallization or evaporation. The degree of separation obtained between $H_3PO_3$ and $H_3PO_4$ according to the present invention is dependent upon many factors such as the particular amine used, the ratio of amine to $H_3PO_3$, the particular solvent used, the ratio of $H_3PO_3:H_3PO_4$ in the initial aqueous mixture, etc. As will be illustrated hereinafter, weight ratios of approximately 94:6 $H_3PO_3:H_3PO_4$ have been obtained in a single batch extraction from acid mixtures having an initial weight ratio of approximately 69:31. If after a single extraction, it is desired to achieve a higher degree of separation than has been obtained, the acid can be subjected to one or more additional extractions according to the process herein.

The mixtures of phosphorous and phosphoric acids to be separated by the process of the present invention can come from a variety of sources, e.g., from the oxidation of phosphorous in a moist atmosphere, from the vapor phase oxidation of phosphorous in the presence of CO and $CO_2$ followed by hydrolysis, as described in patent application Ser. No. 566,482, filed July 20, 1966, now U.S. Pat. No. 3,532,461 or from the liquid phase oxidation of phosphorous followed by hydrolysis as described in patent application Ser. No. 678,280, filed Oct. 27, 1967, now Pat. No. 3,528,772. The mixtures of these acids normally occur in aqueous solutions. If they are not in aqueous solutions, they must be put into aqueous solutions to be separated by the process herein. The mixed $H_3PO_3$ and $H_3PO_4$ acids comprise from about 1 percent to about 75 percent by weight, and preferably about 5 percent to about 30 percent by weight of the aqueous solution. Hereinafter all percentages are by weight, unless specified otherwise. Solutions which are outside the aforementioned concentrations can be adjusted to the desired concentrations by conventional means such as dilution or evaporation. The ratio of $H_3PO_3:H_3PO_4$ in the aqueous solution is not critical but is generally between 25:75 and 99:1.

A wide variety of primary, secondary and tertiary amines can be used in the process herein. Specifically, primary branched and straight chain alkyl amines having carbon chains containing from about three to about 18 carbon atoms, secondary branched and straight chain alkyl amines having carbon chains containing from about three to about 12 carbon atoms in each chain and tertiary branched and straight chain alkyl amines having carbon chains containing from about three to about 12 carbon atoms in each chain can be used. Examples of suitable amines include but are not limited to propylamine, isohexylamine, 5-ethyl octylamine, dodecylamine, hexadecylamine, di-isopropyl amine, di-dodecyl amine, tributyl amine, tri-isoctyl amine and trilauryl amine. Preferred amines are dodecylamine, trilauryl amine and tributyl amine. A particularly preferred amine is dodecylamine. The quantity of amine used in the process is dependent on the quantity of $H_3PO_3$ in the aqueous $H_3PO_3:H_3PO_4$ mixture. The amine ratio, as defined herein, refers to the molar ratio of amine to $H_3PO_3$. This ratio may vary from about 0.1:1 to about 3:1, with the preferred range being from about 0.3:1 to about 1.5:1.

Selection of a solvent is critical to effective practice of the process of the invention. The organic solvent herein must be one which is essentially immiscible with water but in which the amine and the amine-acid salt are highly soluble. Not all solvents meeting this criterion, however, are effective for use in the invention. For example, Smith et al. Journal of the Society of Chemical Industry, Vol. 67, pp. 48–51 (1948) teaches the use of chloroform as a solvent in the separation of strong acids from weak acids by amine extraction, and a General Mills trade publication by Agers et al., "The Purification of Inorganic Acids by the Amine Liquid Ion Exchange Process" (1963) teaches the use of chloroform or benzene as solvents in the amine extraction of $H_3PO_4$ from aqueous solutions. In contrast to these prior art teachings, both chloroform and benzene have been found to be inoperable as solvents in the separation of $H_3PO_3$ from $H_3PO_4$ in the instant invention. Solvents which have been found suitable for use herein are kerosene, primary straight or branched chain alcohols having from four to about 10 carbon atoms in the alkyl chain and certain tri- and dialkyl phosphate and dialkyl phosphite esters. Ordinarily the solvent is recycled in the process and is thus saturated with water after the first use. Examples of suitable alcohols for use as solvents herein are n-butanol, n-pentanol, 3-methyl pentanol, n-hexanol, isoctanol and n-decanol. The tri- and dialkyl phosphate and dialkyl phosphite esters suitable for use as solvents herein have, respectively, the following general formulas:

$R_2R'PO_4$ and $R_2HPO_3$ wherein R is a straight or branched chain alkyl group containing one to about 10 carbon atoms and R' is hydrogen or a straight or branched chain alkyl group containing one to about 10 carbon atoms. Specific examples of phosphate and phosphite ester solvents are trimethyl phosphate, tri-isopropyl phosphate, tributyl phosphate, trihexyl phosphate, di-isopropyl phosphate, dibutyl phosphate, dinonyl phosphate, dimethyl phosphite, di-isopropyl phosphite, dihexyl phosphite and dioctyl phosphite. Preferred solvents are kerosene, n-hexanol and tributyl phosphate. Mixtures of suitable solvents can also be used. For example, mixtures of n-hexanol and kerosene are very effective and are preferred because of their good performance and relatively low cost. When mixtures of n-hexanol and kerosene are used, they preferably contain a weight ratio of kerosene:n-hexanol of 25:75 to 75:25. The most preferred system herein is one consisting of kerosene and n-hexanol in a 50:50 weight ratio. Although $H_3PO_3$ is primarily taken into the solvent phase through formation of an amine-acid salt, a small amount may also enter the solvent phase by solvent extraction. This is particularly true when alcohols and phosphate or phosphite esters are used as solvents.

The quantity of solvent to be used in the process of the invention is dependent upon the quantity of water in the aqueous $H_3PO_3:H_3PO_4$ solution. The solvent ratio, as defined herein, refers to the volume of solvent relative to the volume of water from the aqueous $H_3PO_3:H_3PO_4$ solution. The solvent ratio can vary from about 0.5:1 to about 10:1 with the preferred range being between about 0.75:1 to about 4:1.

The acid which is held in the extract phase through formation of the amine-acid salt can be displaced or stripped from the amine into an aqueous solution in a variety of ways. The preferred means is by acid stripping. According to this method the extract phase is treated with an aqueous solution of an acid having a greater strength than phosphorous acid, i.e., an acid having a dissociation constant higher than the first dissociation constant of phosphorous acid ($1.6 \times 10^{-2}$ at 25° C.). Examples of such acids are hydrochloric, hydrobromic, trichloro-acetic and picric acids. Hydrochloric and hydrobromic acids are preferred since they can be removed from the amine/solvent solution by boiling, thus providing an easy means of regenerating the free-amine. The molar ratio of stripping acid to total $H_3PO_3$ and $H_3PO_4$ in the extract phase should be approximately 1:1 or less. Molar ratios in the range of 0.5:1 to 1:1 are preferred. Most of the $H_3PO_3$ and $H_3PO_4$ in the extract phase is present in the form of an amine-acid salt, but a minor proportion is also present as the free acid. As used herein, the term "total $H_3PO_3$ and $H_3$ and $H_3PO_4$" in the extract phase includes acid which is in the form of the amine-acid salt, as well as the free acid. The volume of water in which the stripping acid is dissolved is not critical, but is generally from about 0.1 to 10 times the volume of the extract phase. If one stripping does not displace all or nearly all of the acid from the amine-acid salt, the extract phase can be subjected to successive strippings to achieve the desired degree of displacement.

Temperature is not a critical factor in the practice of the process herein, but it is contemplated that the process will normally be carried out at ambient temperatures, i.e. about 50° to about 100° F. except for the use of high-temperature hydrolysis displacement described below.

In alkali stripping the extract phase is mixed with a volume of water which is 2 to 4 times the volume of said phase and sufficient alkali (e.g. KOH or NaOH) is added to the mixture to obtain a pH of about 4.5 in the aqueous phase. This results in the displacement of the acid into the aqueous phase through formation of the mono basic salt. The aqueous phase is then passed through an ion exchange column containing an acidic cation exchange resin to convert the salt to the free acid.

In high temperature hydrolysis displacement, the extract phase is mixed with a volume of water which is about 2-5 times the volume of said phase and the mixture is held at a temperature of about 150° to 400° F. for from about 15 minutes to about 2 hours. This causes hydrolysis of the amine-acid salt in the extract phase and the migration of free acid into the aqueous phase. The two phases are separated while hot. The aqueous phase can then be concentrated by evaporation or distillation to obtain the desired concentration of acid.

In a preferred manner of carrying out the process of the invention, an aqueous solution of a mixture of $H_3PO_3$ and $H_3PO_4$, containing about 5 percent to about 30 percent total acid, is intimately mixed with a solution of amine such as dodecylamine in a solvent such as n-hexanol. The amine is present in the mixture at a molar ratio of amine:$H_3PO_3$ of about 0.3:1 to about 1.5:1 and the solvent is present at a volume ratio of solvent:water of about 0.75:1 to about 4:1. After the resulting mixture has separated into two phases the extract or solvent phase containing the acid salt of the amine is removed from the aqueous raffinate phase and treated with an aqueous solution of hydrochloric acid, said solution having a volume of about 0.1 to 10 times the volume of the extract phase. The molar ratio of hydrochloric acid to the total $H_3PO_3$ and $H_3PO_4$ in the extract phase is 1:1 or less. (The molar amount of total $H_3PO_3$ and $H_3PO_4$ in the extract phase can be determined by titration of a small sample prior to treatment with hydrochloric acid). The aqueous phase, containing acid displaced from the solvent phase is then removed from the solvent phase. The solvent phase is boiled to remove hydrochloric acid, thus regenerating the amine and rendering the amine/solvent mixture suitable for further use in extracting $H_3PO_3$ from $H_3PO_3:H_3PO_4$ mixtures. The aqueous phase can then be diluted with water or concentrated by conventional means such as distillation or evaporation to obtain the desired concentration of $H_3PO_3$.

The invention will be further illustrated by the following examples.

EXAMPLE I

Four hundred fifty-nine milliliters (380 g.) n-hexanol (saturated with water), 115 g. water, 12.8 g. (0.075 mol) tri n-butyl amine and 20 g. of an aqueous mixture containing 9.23 g. 0.112 mol) $H_3PO_3$ and 4.20 g. (0.043 mol) $H_3PO_4$ (69:31 wt. ratio $H_3PO_3:H_3PO_4$) were mixed and shaken vigorously in a separatory funnel. The resulting mixture was then allowed to settle into two layers, giving 112 ml. of aqueous raffinate phase and 485 ml. of extract phase and the two phases were separated by drawing off the heavier raffinate phase. After separation of the two phases, 5 ml. of the raffinate phase was diluted to 250 ml. with water and titrated with 0.1 N sodium hydroxide to pH 4.5 to determine total acid in the raffinate phase. Another sample from this phase was subjected to nuclear magnetic resonance (nmr) for determination of the ratio of $H_3PO_3:H_3PO_4$. Based on the results of these analyses it was determined that the raffinate phase contained 3.16 g. $H_3PO_3$ and 2.03 g. $H_3PO_4$. Thus, the extract phase contained by difference, 9.23−3.16 or 6.07 g. $H_3PO_3$ and 4.20−2.03 or 2.17 g. $H_3PO_4$. This is a ratio of 74.26 $H_3PO_3:H_3PO_4$ compared to 69:31 in the original aqueous mixture of acid. The percent recovery of $H_3PO_3$ originally charged to the separatory funnel was 66 percent.

Two hundred milliliters of the above 485 ml. of extract phase, containing 2.51 g. (0.031 mol) $H_3PO_3$ and 0.896 (0.0092 mol) $H_3PO_4$ was mixed with 198 ml. water in a separatory funnel. The mixture was shaken vigorously and then 3.85 ml. of 37.5 percent strength hydrochloric acid (0.04 mol) was added slowly, followed by further vigorous shaking. After the mixture separated into two phases, the aqueous phase was removed and analyzed for total phosphorous, and the ratio of $H_3PO_3:H_3PO_4$ was determined by nmr. The results showed that the aqueous phase contained 1.944 g. $H_3PO_3$ and 0.369 g. $H_3PO_4$, i.e., a ratio of $H_3PO_3:H_3PO_4$ of 83:17. The hydrochloric acid stripping resulted in recovery of 1.94/6.07×485/200×100 or 78 percent of the phosphorous acid originally extracted into the extract phase. The solvent phase, containing hydrochloric acid from the stripping treatment is boiled to remove hydrochloric acid and regenerate the free amine.

Substantially similar results are obtained when propylamine, isohexylamine, 5-ethyl octylamine, dodecylamine, di-isopropyl amine, propyl hexyl amine, tri-isooctyl amine and tri-lauryl amine, respectively, are substituted in an equal molar amount for tributyl amine in this example. Substantially similar results are also obtained when n-butanol, n-pentanol, 3-methyl pentanol, iso-octanol, n-decanol, tributyl phosphate, tri-isopropyl phosphate, dimethyl phosphite and kerosene, respectively, are substituted on an equal weight basis for n-hexanol in this example.

Substantially similar results are also obtained when hydrobromic, trichloroacetic and picric acid, respectively, are used in place of hydrochloric acid on an equal molar basis for stripping the phosphorous and phosphoric acid from the extract phase in this example, except that in the case of the latter two acids, the amine is not regenerated by boiling the solvent phase.

EXAMPLE II

Four hundred milliliters (322 g.) n-hexanol (saturated with water) 59 ml. (58 g.) tributyl phosphate, 9.96 g. (0.054 mol) dodecylamine, 115 g. water and 20 g. of an aqueous mixture containing 9.23 g. (0.112 mol) $H_3PO_3$ and 4.20 g. (0.043 mol) $H_3PO_4$ (69:31 wt. ratio $H_3PO_3:H_3PO_4$) were mixed and shaken vigorously in a separatory funnel. The resulting mixture was then allowed to settle into two layers, giving 101 ml. of an aqueous raffinate phase and 493 ml. of extract phase and two phases were separated by drawing off the heavier raffinate phase. After separation of the two phases, 5 ml. of the raffinate phase was diluted to 250 ml. with water and titrated with 0.1 N sodium hydroxide to pH 4.5 to determine the total acid in the raffinate phase. Another sample from this phase was subjected to nuclear magnetic resonance (nmr) for determination of the ratio of $H_3PO_3:H_3PO_4$. Based on the results of these analyses it was determined that the raffinate phase contained 2.88 g. $H_3PO_3$ and 2.75 g. $H_3PO_4$. Thus, the extract phase contained, by difference, 6.35 g. $H_3PO_3$ and 1.45 g. $H_3PO_4$. This is a ratio of 82:18 $H_3PO_3:H_3PO_4$ compared to 69:31 in the original aqueous mixture of acids. The percent recovery of $H_3PO_3$ originally charged to the separatory funnel was 69 percent.

The acid is recovered from the extract phase by treatment with aqueous hydrochloric acid in a manner substantially the same as that used in example I.

EXAMPLE III

Seventy-three milliliters (60 g.) n-hexanol (saturated with water), 75 ml. (60 g.) kerosene, 618 g. (0.034 mol) dodecylamine, 115 ml. water and 20 g. of an aqueous mixture containing 9.23 g. (0.112 mol) $H_3PO_3$ and 4.20 g. (0.043 mol) $H_3PO_4$ (69:31 wt. ratio $H_3PO_3:H_3PO_4$) were mixed and shaken vigorously in a separatory funnel. The resulting mixture was then allowed to settle into two layers, giving 114 ml. of aqueous raffinate phase and 170.5 ml. of extract phase and the two phases were separated by drawing off the heavier raffinate phase. After separation of the two phases, 5 ml. of the raffinate phase was diluted to 250 ml. with water and titrated with 0.10 N sodium hydroxide to pH 4.5 to determine the total acid in the raffinate phase. Another sample from this phase was subjected to nuclear magnetic resonance (nmr) for determination of the ratio of $H_3PO_3:H_3PO_4$. Based on the results of these analyses, it was determined that the raffinate phase contained 5.79 g. $H_3PO_3$ and 3.97 g. $H_3PO_4$. Thus, the extract phase contained by difference, 3.44 g. $H_3$3and 0.23 g. $H_3PO_4$. This is a ratio of 94:6 $H_3PO_3:H_3PO_4$ compared to 69:31 in the original aqueous mixtures of acids. The percent recovery of $H_3PO_3$ originally charged to the separatory funnel was 37 percent. The acid is recovered from the extract phase by treatment with aqueous hydrochloric acid in the manner illustrated in example I.

EXAMPLE IV

One hundred kilograms of an aqueous solution containing 80 percent $H_3PO_3:H_3PO_4$ in a 74:26 weight ratio and 20 percent water is obtained from the process described in U.S. Pat applications Ser. No. 678,280, filed Oct. 27, 1967. The solution is diluted with 300 g. of water to obtain a solution containing 20 percent total acid. This aqueous solution of acid is then mixed with 130 g. (158 liters) n-hexanol (saturated with water) 130 g. (162 liters) kerosene and 41 g. dodecylamine. The entire mixture is thoroughly stirred and allowed to settle into two phases and the two phases are separated by drawing off the heavier raffinate phase. After separation of the two phases a sample of the raffinate phase is titrated with 0.1 N sodium hydroxide to pH 4.5 to determine the total acid in the raffinate phase. The amount of total acid in the extract or solvent phase is then calculated by difference. The solvent phase is then mixed with a volume of water equal to the volume of said solvent phase and hydrochloric acid is added to the mixture, the amount of the hydrochloric acid being the molar equivalent of the total amount of $H_3PO_3$ and $H_3PO_4$ previously determined to be present in the solvent phase. After the mixture has settled into two phases, the aqueous phase, containing $H_3PO_3:H_3PO_4$ in approximately a 95:5 weight ratio is drawn off. The solvent phase is boiled to remove hydrochloric acid and regenerate the free amine.

The mixture of $H_3PO_3:H_3PO_4$, enriched in $H_3PO_3$, in this example is displaced from the extract phase by alkaline stripping and by high temperature hydrolysis, respectively, rather than by stripping with hydrochloric acid with comparable results.

What is claimed is:

1. A method for separating phosphorous acid from phosphoric acid comprising the steps of:
   1. mixing an aqueous solution of a mixture of phosphorous acid and phosphoric acid with a solvent and an amine, said solvent being selected from the group consisting of kerosene, primary straight and branched chain alcohols having from four to about 10 carbon atoms in the alkyl chain and di- and trialkyl phosphate esters and dialkyl phosphite esters which, respectively, have the following general formulas:

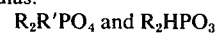
   $R_2R'PO_4$ and $R_2HPO_3$ wherein each R is a straight or branched chain alkyl group containing from one to about 10 carbon atoms and R' is hydrogen or a straight or branched chain alkyl group containing from one to about 10 carbon atoms, and said amine being selected from the group consisting of primary branched and straight chain alkyl amines having carbon chains containing from about three to about 18 carbon atoms, secondary branched and straight chain alkyl amines having carbon atoms containing from about three to about 12 carbon atoms in each chain and tertiary branched and straight chain alkyl amines having from about three to about 12 carbon atoms in each chain, whereby the phosphorous acid is preferably taken into the solvent phase primarily through formation of an amine-acid salt, thus forming an extract phase rich in phosphorous acid and a raffinate phase rich in phosphoric acid,
   2. removing the extract from the raffinate phase, and
   3. displacing the acid from the extract phase.

2. The process of claim 1, wherein the displacement of step 3 is conducted by means of acid stripping with an aqueous solution of an acid having an ionization constant higher than the first ionization constant of phosphorous acid.

3. The process of claim 1 wherein the aqueous solution of the mixture of phosphorous and phosphoric acids in step 1 has a total acid concentration of 1 percent to 75 percent by weight.

4. The process of claim 3 wherein the total acid concentration is 5 percent to 35 percent by weight.

5. The process of claim 1 wherein the solvent in step 1 present in amount such that the ratio of solvent to water is from about 0.5:1 to about 10:1 by weight.

6. The process of claim 5 wherein the ratio of solvent to water in step 1 is from about 0.75:1 to about 4:1 by weight.

7. The process of claim 1 wherein the amine in step 1 is present in an amount such that the molar ratio of amine to phosphorous acid is from about 0.1:1 to about 10:1.

8. The process of claim 7 wherein in step 1 the molar ratio of amine to phosphorous acid is from about 0.3:1 to about 1.5:1.

9. The process of claim 1 wherein in step 3 the stripping agent is selected from the group consisting of hydrochloric, hydrobromic, trichloroacetic and picric acids, and is used in amount such that the molar ratio of stripping agent to total $H_3PO_3$ and $H_3PO_4$ in the extract phase is 1:1 or less.

10. The process of claim 9 wherein in step 3 the stripping agent is hydrochloric acid.

11. The process of claim 10 including the additional step of boiling the extract phase after stripping, thereby removing hydrochloric acid and regenerating the free amine.

* * * * *

PO-1050
(5/69)

UNITED STATES PATENT OFFICE
CERTIFICATE OF CORRECTION

Patent No. 3,632,311          Dated January 4, 1972

Inventor(s) William L. Kovacs, Phillip F. Pflaumer and David D. Whyte

It is certified that error appears in the above-identified patent and that said Letters Patent are hereby corrected as shown below:

In the Abstract, line 2, "$H_3PO_4$" should read -- $H_3PO_3$ -- .

Column 2, line 20, after "acids" insert -- can --.

Column 4, line 45, before "0.112 mol)" insert -- ( -- .

Column 4, line 60, "74.26" should read -- 74:26 -- .

Column 5, line 73, "$H_33$" should read -- $H_3PO_3$ -- .

Column 6, lines 11, 13 and 14, "g." should read -- kg --; line 55, "having carbon atoms" should read -- having carbon chains --; line 60, "preferably" should read -- preferentially --; line 64, after "removing the extract" insert -- phase --.

Column 7, line 1, "5" should read -- is --; line 2, "35" should read -- an --.

Signed and sealed this 4th day of July 1972.

(SEAL)
Attest:

EDWARD M. FLETCHER, JR.          ROBERT GOTTSCHALK
Attesting Officer          Commissioner of Patents